(12) United States Patent
Lehmann et al.

(10) Patent No.: US 12,575,494 B2
(45) Date of Patent: Mar. 17, 2026

(54) CAPACITIVE PARAMETER MEASUREMENT IN A SELF-PROPELLED FORAGE HARVESTER

(71) Applicant: CLAAS Selbstfahrende Erntemaschinen GmbH, Harsewinkel (DE)

(72) Inventors: Christoph Lehmann, Belm (DE); Dennis Neitemeier, Lippetal (DE); Christoph Heitmann, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 837 days.

(21) Appl. No.: 17/893,315

(22) Filed: Aug. 23, 2022

(65) Prior Publication Data

US 2023/0060670 A1    Mar. 2, 2023

(30) Foreign Application Priority Data

Aug. 26, 2021    (DE) ..................... 10 2021 122 076.9
Aug. 31, 2021    (DE) ..................... 10 2021 122 459.4

(51) Int. Cl.
*A01D 41/127*        (2006.01)
*A01D 41/02*         (2006.01)
*A01D 41/06*         (2006.01)

(52) U.S. Cl.
CPC ........... *A01D 41/127* (2013.01); *A01D 41/02* (2013.01); *A01D 41/06* (2013.01)

(58) Field of Classification Search
CPC ...... A01D 41/127; A01D 41/02; A01D 41/06; A01D 41/1271; A01D 43/085; G01F 1/002; G01F 1/56; G01F 23/263
See application file for complete search history.

(56) References Cited

U.S. PATENT DOCUMENTS 5,351,558 A  *  10/1994  Horn .................. A01D 41/1272
                                                              73/861.08
6,437,582 B1 *  8/2002  Rode .................. A01D 41/1277
                                                              73/335.04

(Continued)

FOREIGN PATENT DOCUMENTS

DE        4041995 A1  *  7/1992  ........... A01D 43/085
DE      19934881 A1      1/2001

(Continued)

OTHER PUBLICATIONS

Translation of Document DE 4041995 A1 as retrieved on Jul. 11, 2025 (Year: 1990).*

(Continued)

*Primary Examiner* — Joseph M Rocca
*Assistant Examiner* — Jose Antonio Martinez
(74) *Attorney, Agent, or Firm* — Lempia Summerfield Katz LLC

(57) ABSTRACT

A self-propelled forage harvester and a method for controlling said forage harvester are disclosed. A measuring device of the forage harvester may have a plurality of electrodes spaced at a distance from each other. These electrodes may be arranged or positioned in an intermediate channel of a harvested material processing channel of the forage harvester and may form a plurality of capacitors. Further, delivery-specific parameters and/or material-specific parameters may be discernible from the measurements of the electrical capacitances of the plurality of capacitors.

20 Claims, 8 Drawing Sheets

(56)                    References Cited

U.S. PATENT DOCUMENTS

|  |  |  |  |  |
|---|---|---|---|---|
| 11,122,739 | B2 | 9/2021 | Heitmann | |
| 2015/0233855 | A1* | 8/2015 | Delie | G01N 33/0098 |
| | | | | 324/694 |
| 2021/0029878 | A1* | 2/2021 | Vandike | A01D 41/127 |
| 2023/0243761 | A1* | 8/2023 | Somarowthu | A01F 15/08 |
| | | | | 701/50 |

FOREIGN PATENT DOCUMENTS

|  |  |  |  |  |
|---|---|---|---|---|
| DE | 102010037915 | A1 | 4/2012 | |
| DE | 102018208791 | A1* | 12/2019 | F16C 19/18 |
| EP | 3300581 | B1 | 8/2019 | |

OTHER PUBLICATIONS

Translation of Document DE 102018208791 A1 as retrieved on Jul. 11, 2025 (Year: 2019).*

European Search Report for European application No. 22173931. 1-1105 mailed Nov. 4, 2022.

\* cited by examiner

103

2

104

14

16

16

103

2

104

14

CAPACITIVE PARAMETER MEASUREMENT IN A SELF-PROPELLED FORAGE HARVESTER

CROSS REFERENCE TO RELATED APPLICATIONS

This application claims priority under 35 U.S.C. § 119 to German Patent Application No. DE 10 2021 122 076.9 with filing date Aug. 26, 2021 and to German Patent Application No. DE 10 2021 122 459.4 with filing date Aug. 31, 2021, the entire disclosure of both of which are hereby incorporated by reference herein.

TECHNICAL FIELD

The present invention relates to a self-propelled forage harvester and a method for controlling a self-propelled forage harvester.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Typically, several constituents of material, such as two constituents of material, are delivered to or in a self-propelled forage harvester from an attachment into a harvested material processing channel. These constituents of material form a flow of harvested material in a self-propelled forage harvester that frequently does not have an even, and/or any, rectangular cross-sectional distribution. When there are two strands of material, frequently a flow of harvested material therefore arises with an M-shaped cross-sectional distribution. Such an uneven cross-sectional distribution of the flow of harvested material yields inferior chopping quality which may yield inferior cutting quality with excess lengths of harvested material. Furthermore, an uneven and/or nonrectangular cross-sectional distribution of the flow of harvested material may unevenly wear the components of the forage harvester. The uneven wear of the components, such as the blades, crack rollers, etc., may reduce the usable life of the components.

EP 3 300 581 B1 describes a forage harvester with a measuring bar that has a plurality of sensors and at least partially extends through the harvested material processing channel. Further, the measuring bar may detect a transverse distribution within the harvested material processing channel. The sensors may be designed as capacitive sensors. EP 3 300 581 B1 further discloses a measuring bar arranged or positioned in the feeder housing, on a cutterhead, on a conditioning roller, or on a post-acceleration drum.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
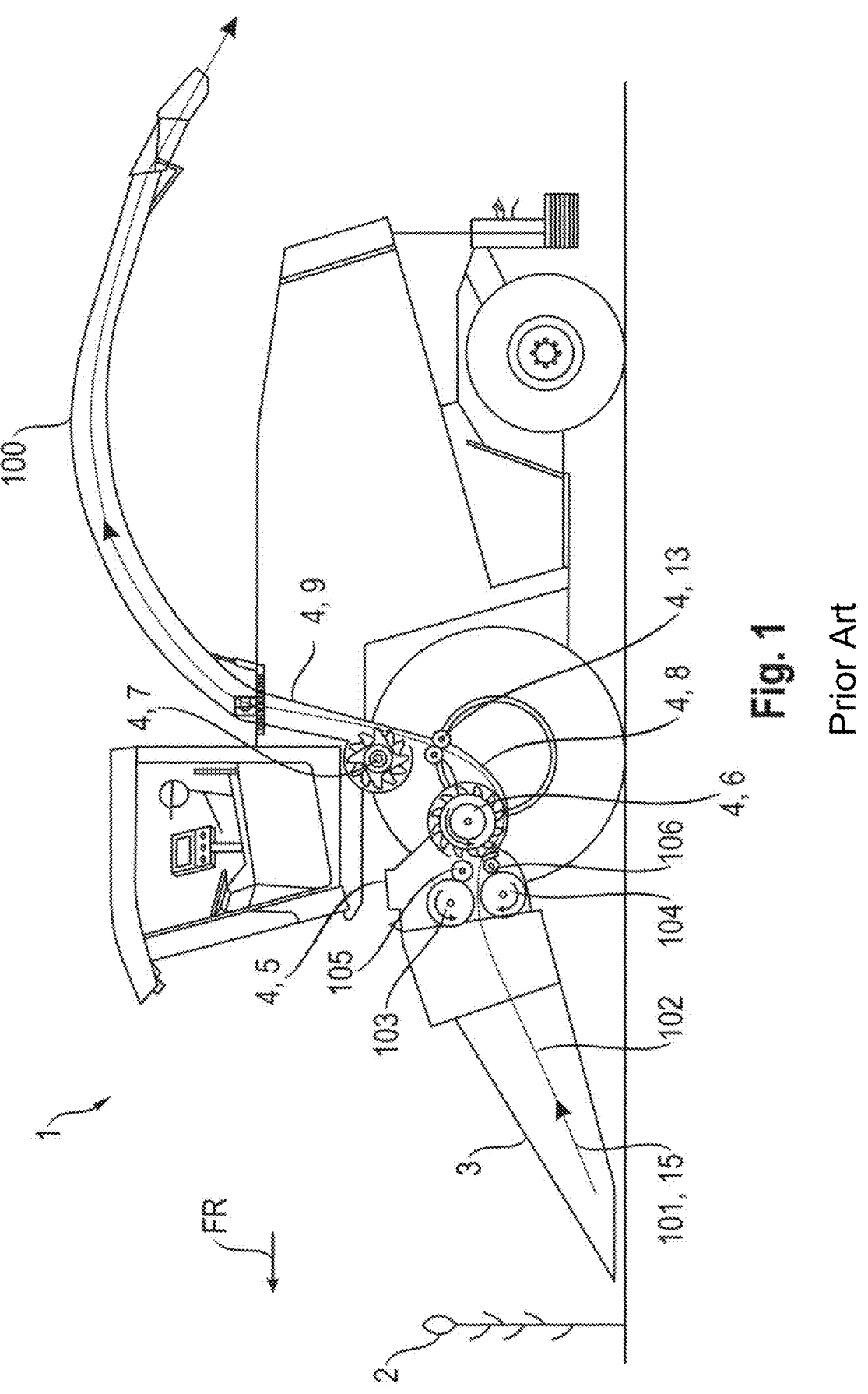
FIG. 1 shows a self-propelled forage harvester according to the prior art.

Measuring devices for the self-propelled forage harvester may assist in controlling the flow of harvested material therein. However, there may be instances where a different type of measuring device may better determine the flow of harvested material within the forage harvester.

Thus, in one or some embodiments, a self-propelled forage harvester having a measuring device is disclosed. A measuring device of the forage harvester may have a plurality of electrodes spaced at a distance from each other. These electrodes may be arranged or positioned in an intermediate channel of a harvested material processing channel of the forage harvester and may form a plurality of capacitors. In one or some embodiments, one or both of delivery-specific parameter(s) or material-specific parameter(s) may be determined from the measurements of the electrical capacitances of the plurality of capacitors. In particular, a transverse distribution of the harvested material may be determined using the measured capacitances of all capacitors, and an optimization and/or improvement of the transverse distribution of the harvested material may be realized in the event that the transverse distribution of the harvested material is uneven.

In one or some embodiments, the self-propelled forage harvester is configured to work or be connected to an attachment for collecting harvested material and includes a harvested material processing channel that is downstream from the attachment. The attachment may have adjustable, such as one or both of unevenly adjustable actuators or differently adjustable actuators, for picking up or collecting the harvested material. The attachment may be designed such that any one, any combination, or all of the position, the spacing, or the rotational speed of one or more actuators of the attachment may be established or determined.

In one or some embodiments, the harvested material processing channel has a feeder housing for supplying the harvested material to the forage harvester, a cutterhead for processing the harvested material, and a post-acceleration drum for the post-acceleration of the harvested material. Furthermore, the harvested material processing channel may have an intermediate channel for forwarding the harvested material from the cutterhead to the post-acceleration drum, and an ejection shaft for ejecting the harvested material.

The feeder housing for supplying the harvested material may have adjustable actuator(s), such as one or both of unevenly adjustable actuator(s) or differently adjustable actuator(s), configured to feed the harvested material. The harvested material processing channel, such as the feeder housing, may be designed such that any one, any combination, or all of the position, the spacing, or the rotational speed of one or more actuators of the feeder housing may be established. Such actuators may be, for example, one or both of feed drums or prepress drums.

In one or some embodiments, the cutterhead may be designed to rotate about, and/or may be mounted on a cutterhead rotational axis. The post-acceleration drum may be designed to rotate about, and/or may be mounted on a post-acceleration drum rotational axis. In one or some embodiments, the cutterhead rotational axis may be oriented parallel to the post-acceleration drum rotational axis.

In one or some embodiments, the forage harvester may have a measuring device configured to detect or determine one or both of delivery-specific parameter(s) and/or material-specific parameter(s). Delivery-specific parameters and/or material-specific parameters may be any one, any combination, or all of the cross-sectional distribution of the delivered harvested material, the moisture of the delivered harvested material, the density of the delivered harvested material, or the throughput of the delivered harvested material. Other delivery-specific parameters and/or material-specific parameters are contemplated.

In one or some embodiments, the cross-sectional distribution of the delivered harvest material may be dependent on any one, any combination, or all of: on the guidance of the harvested material in the attachment, on the guidance of the harvested material in the feeder housing, on the process parameters, or on plant parameters.

In one or some embodiments, the measuring device has a plurality of electrodes spaced at a distance from each other. These electrodes may be arranged or positioned in an intermediate channel of a harvested material processing channel and may form a plurality of capacitors. One or both of the delivery-specific parameters and/or material-specific parameters may be discernible or determined from the measurements of the electrical capacitances of the plurality of capacitors. Two electrodes at a distance from each other may form a capacitor. The arrangement of the electrodes in the intermediate channel may have the advantage that, for example, the cross-sectional distribution of the delivered harvested material may be measured for the region before the post-accelerator. In contrast to this, the comminuted harvested material or chopped material following the post-accelerator may be constricted so that a measurement of the cross-sectional distribution of the delivered harvested material after the post-accelerator is not informative or probative, for example for the region before the post-accelerator.

In one or some embodiments, the electrodes may each have a protective apparatus, such as one or both of an electrically poorly conductive layer or a nonconductive layer. In addition, or alternatively, this protective apparatus may be formed from a nonmetallic material. The electrodes may be arranged or positioned for contact-free measurement (e.g., little or no contact with the flow of harvested material) within at least one wall of the intermediate channel.

In one or some embodiments, the capacitance of the capacitors in the intermediate channel of the harvested material processing channel is influenced or impacted by the comminuted harvested material or chopped material that was chopped by the cutterhead. In comparison to air, chopped material has a significantly higher permittivity. The higher permittivity of the chopped material may arise from a higher water volume in comparison to air. This property causes the capacitance of a capacitor to change when the chopped material is in the proximity of the capacitor in comparison to air. Consequently, one or both of delivery-specific parameter(s) or material-specific parameter(s) may be discernible or determined from the measurements of the electrical capacitances of the capacitors. For example, a relative change in the transverse distribution of the chopped material may cause a relative change in the permeability, and therefore a relative change in the capacitances of the capacitors. Subsequently, one or more actuators, such as actuator(s) of the attachment and/or actuator(s) of the feeder housing, may be actuated depending on the determined delivery-specific parameters and/or material-specific parameters. In one or some embodiments, such an actuation of these actuators may result in an even and/or rectangular cross-sectional distribution of the harvested material so that improved prepressing, such as even prepressing, of the harvested material may be achieved. The disclosed system may further allow for improved utilization, such as maximum utilization, of the forage harvester. The sensor system with the capacitors may be employed for many crop types, such as some or all typically-used crop types, since different permittivity when compared to air may generally be provided by the water content of the plants.

In one or some embodiments, the electrodes may be arranged or positioned within at least one wall of the intermediate channel. Accordingly, an additional measuring bar, which may cause greater flow resistance in the flow of harvested material, may be omitted. Thus, despite using the available electrodes, removing the additional measuring bar may improve, such as optimize or minimize, the flow resistance for the comminuted harvested material, or chopped material within the intermediate channel. Accordingly, contact-free measurement of the capacitances of the capacitors may be achieved so that, when selecting the installation site(s) for the electrodes, potential clogging of the comminuted harvested material or chopped material need not be considered.

In one or some embodiments, the intermediate channel may have a plurality of walls, such as opposing walls. At least some, such as all, electrodes may be arranged or positioned within a single wall of the intermediate channel, or may be arranged or positioned within several walls of the intermediate channel, such as within two opposing walls of the intermediate channel. may be arranged or positioned the electrodes may each have a protective apparatus. In one or some embodiments, the protective apparatuses may be designed to be flush with an inner surface within or on the intermediate channel.

In one or some embodiments, the harvested material processing channel has a conditioning apparatus for conditioning the harvested material. In one or some embodiments, the conditioning apparatus may be arranged or positioned between the cutterhead and the post-acceleration drum, wherein the electrodes in the intermediate channel are arranged or positioned between the cutterhead and the conditioning apparatus. One example conditioning apparatus may be a corn cracker. This may allow delivery-specific parameters and/or material-specific parameters to be determined before the conditioning apparatus. In particular, the positioning of the sensor system may enable determining the various parameters (e.g., delivery-specific parameters and/or material-specific parameters) to be determined for the flow of harvested material prior to processing by the conditioning apparatus.

In one or some embodiments, the capacitors are arranged or positioned in the intermediate channel along a transverse direction transverse to the direction of flow of the harvested material. Alternately, or in addition, the electrodes of the capacitors are arranged or positioned at a distance from each other relative to a height direction that is oriented transverse to the direction of flow of the harvested material and transverse to the transverse direction so that the harvested material may flow through the capacitors. In one or some embodiments, the transverse direction may be oriented parallel to the cutterhead rotational axis and/or parallel to the post-acceleration rotational axis.

In one or some embodiments, the electrodes of the capacitors may be arranged or positioned within two opposing walls of the intermediate channel. The electrodes of a capacitor may have a spacing up to 200 mm, such as up to 150 mm, relative to the height direction. An electrode may have a flow length in the direction of flow and a transverse length in the transverse direction. In one or some embodiments, the flow length of the electrode may be at most two times (or at most four times) as long as the transverse length of the electrode. For example, the flow length of the electrode may be 40 mm, whereas the transverse length of the electrode may be 22 mm. In one or some embodiments, each electrode of all the capacitors may have such a design.

In one or some embodiments, an electrode of a capacitor forms an intermediate capacitor with an electrode of at least one additional capacitor, wherein the spacing between these electrodes of the intermediate capacitor may be greater than the spacing of the electrodes of the capacitors. In one or some embodiments, the spacing of the electrodes of the capacitors corresponds to the spacing of the electrodes with respect to the height direction. To enable an improved resolution of the transverse distribution of the delivered harvested material, not only the opposing electrodes may be evaluated, but also electrodes at a greater distance from each other may likewise be evaluated. By using a previously determined sensitivity distribution matrix, the cross-sectional distribution calculation may be improved by these additional measurements. The capacitances are, for example, determined over the transverse direction. After the flow of harvested material passes through, the measuring results may be evaluated with the addition of the sensitivity distribution matrix, and a permittivity distribution over the transverse direction may be determined.

In one or some embodiments, a single electrode is arranged or positioned at a distance from a plurality of electrodes with respect to the height direction. In one or some embodiments, this single electrode may form several capacitors with some or all electrodes that are spaced apart with respect to the height direction. The plurality of electrodes that are arranged or positioned at a distance from the single electrode may be arranged or positioned in a plane and/may be or coplanar. In one or some embodiments, the single electrode always and simultaneously forms a capacitor with each of the electrodes that are spaced with respect to the height direction. The advantage of this simultaneous measurement is that errors or deviations from the changes over time of the throughput of the comminuted harvested material or chopped material are reduced or minimized.

In one or some embodiments, the single electrode has a greater extension (e.g., a greater distance) with respect to the transverse direction than the electrodes spaced apart with respect to the height direction, and/or the single electrode has a greater extension (e.g., a greater distance) along the transverse direction than the sum of the transverse direction extensions of all the electrodes spaced apart with respect to the height direction. This may allow the shortest distance between the single electrode and all electrodes spaced apart with respect to the height direction to be reduced.

In one or some embodiments, at least two electrodes which are spaced apart with respect to the transverse direction and whose position coincides with respect to the height direction form a transverse capacitor. In one or some embodiments, some or all electrodes of the measuring device have a coinciding position with respect to the height direction and may be arranged or positioned to be spaced apart from each other in a plane, wherein the capacitance is measurable between any two electrodes since any two electrodes may form a transverse capacitor. Thus, in one or some embodiments, some or all electrodes may be arranged or positioned in a coplanar manner. This makes enable a very compact structure.

In one or some embodiments, the measuring device has a control and regulating device which is designed or configured to detect any one, any combination, or all of: the capacitance of the capacitors; the capacitance of at least one intermediate capacitor; or the capacitance of at least one transverse capacitor. Further, the control and regulating device may be designed or configured to determine the transverse distribution of the harvested material using the detected capacitances. In this case, the control and regulation apparatus may be designed or configured to control actuators of the attachment and/or actuators of the feeder housing with reference to the determined transverse distribution of the harvested material (e.g., responsive to the determined transverse distribution of the harvested material, the control and regulation apparatus may control one or more actuators, such as one or more actuators of the attachment and/or of the feeder housing). More specifically, the control and regulation apparatus may be designed or configured to control the actuators of the attachment and/or the actuators of the feeder housing responsive to the determined lateral distribution of the harvested material in such a way that the lateral distribution of the harvested material is evened out (e.g., responsive to determining a lateral distribution that is greater than a predetermined amount, the control and regulation apparatus may control one or more actuators of the attachment and/or the feeder housing in order to reduce the spread of the distribution, thereby making the lateral distribution more even).

In one or some embodiments, the control and regulation apparatus may be designed to detect one, some or all of: the capacitances of some or all of the capacitors; the capacitances of some or all of the intermediate capacitors; or the capacitances of some or all of the transverse capacitors. Further, the detection of two or all of the following may be performed simultaneously and/or concurrently: the capacitances of some or all of the capacitors; the capacitances of some or all of the intermediate capacitors; or the capacitances of some or all of the transverse capacitors.

In one or some embodiments, the control and regulation apparatus may be designed or configured to successively (e.g., successively over time) detect any two or all of the following: the capacitances of all capacitors; the capacitances of all intermediate capacitors; or the capacitances of all transverse capacitors. In other words, the capacitance between two electrodes may be determined and the capacitance between two further electrodes may be determined subsequently in time.

In one or some embodiments, the measuring device may have any one, any combination, or all of: at least one AC voltage generator for generating an AC voltage; at least one amplifier unit for amplifying a signal; at least one electrical amplifier for converting an input current into a proportional output voltage; at least one detector (e.g., at least one logarithmic detector) for converting an AC voltage into a line signal; or at least one analog-to-digital converter for converting an analog signal into a digital signal (e.g., digitally interpretable signal).

In one or some embodiments, the AC voltage generator may be a direct digital synthesis unit. The amplifier unit may have an incoming signal increased by a fixed factor and/or adjustable factor. In one or some embodiments, the electrical amplifier may be a transimpedance amplifier that converts an input current to a proportional output voltage. The logarithmic detector may be designed to convert the AC voltage of a transimpedance amplifier into a power signal. Further, in one or some embodiments, the measurement device may include one connection component or several connection components. A connection component may be an input component or an output component. Additional components, such as sensors, may be connected to such a connection component.

In this case, the AC voltage generator may be electrically conductively connected to the amplifier unit, wherein the amplifier unit may be electrically conductively connected to a first electrode of a capacitor via a connection component which forms an output component. A second electrode of the capacitor may be spaced apart from the first electrode. Conduction of electrical current between the first electrode and the second electrode may be suppressed or may not form at all. The second electrode of the capacitor may be electrically conductively connected to a further connection component that forms an input component. The additional connection component may be electrically conductively connected to the transimpedance amplifier. The transimpedance amplifier may be electrically conductively connected to the detector, such as to the logarithmic detector. The detector, such as the logarithmic detector, may be electrically conductively connected to the amplifier unit. The amplifier unit may be electrically conductively connected to the analog-to-digital converter. The analog-to-digital converter may be connected to another connection component that forms an output component.

In one or some embodiments, at least one capacitor has two electrodes, wherein these electrodes have a spacing in a range of 130 mm to 180 mm (e.g., at least 130 mm and at most 180 mm), such as 150 mm, with respect to the height direction, and/or at least one capacitor has at least one electrode which has different lengths with respect to the transverse direction and with respect to the direction of flow. This makes it possible to improve or optimize the design of the capacitor with respect to the measurements of the electrical capacitances.

Furthermore, in one or some embodiments, a method, such as a computer-implemented method, is disclosed for controlling a self-propelled forage harvester that performs the following: detecting any one, any combination, or all of the capacitance of some or all of the capacitors, the capacitance of at least one intermediate capacitor, or the capacitance of at least one transverse capacitor; determining the transverse distribution of the harvested material based on the detected capacitance(s); and actuating actuators (such as actuator(s) of the attachment and/or the actuator(s) of the feeder housing) as a function of the determined transverse distribution of the harvested material (e.g., responsive to the determined transverse distribution of the harvested material, actuators are actuated in order to change the transverse distribution of the harvested material).

In one or some embodiments, the detection of a capacitance may correspond to a measurement of the capacitance. The detection of the capacitance may be performed using one or more different methods. For example, any one, any combination, or all of the following may be used to detect the capacitance: a charge/discharge method; an oscillation method; or an alternating voltage approach. In one or some embodiments, the capacitance may be detected in or with a DC field or an AC field. In this case, the alternating field may use a frequency from the low-frequency spectrum, such as up to 10 MHz, up to 30 kHz, up to 3 kHz, up to 300 Hz, or up to 30 Hz. In particular, a frequency between 10 kHz and 10 MHz may be used. The measurement may be performed serially or in parallel. This means that the measurements of the individual capacitances may be performed simultaneously or sequentially in time.

The detection and digitization of the capacitances may be performed using an AC voltage method. Other contemplated circuits are, for example, an RC resonant circuit, LC resonant circuit, or a charge/discharge circuit. The advantage of an AC voltage measurement is the high immunity against stray capacitances and the high possible sampling rates. Also, by using the AC voltage method, the dimension of the frequency of the AC voltage may be included in the measurement. This may potentially compensate for the influence of moisture from or on the measurement results.

In one or some embodiments, if the throughput is unknown, the transverse distribution may be calculated relative to the amount of material, for example. This information may be sufficient to serve as information for machine actuation (e.g., may be sufficient in determine whether (and potentially how much) to control the actuator(s)). Using an additional throughput sensor signal, the relative progression may also be converted into an absolute transverse distribution. The signal of the relative transverse distribution may, in turn, improve the calculation of the throughput, since not only is the maximum height recorded, but also the areas of lower utilization. As a result, the calibrated throughput signal may still provide reliable results even after the infeed has been adjusted, since the transverse distribution may be compensated. It is also contemplated for the sensor to record the total throughput when the system is calibrated and the moisture signal is included in the calculation.

In one or some embodiments, the capacitance of the capacitors (e.g., the capacitance of any one, any combination, or all the following: some or all capacitors; at least one intermediate capacitor; or at least one transverse capacitor) may be detected sequentially over time. Alternatively, or in addition, the capacitance of the capacitors (e.g., the capacitance of any one, any combination, or all the following: some or all capacitors; at least one intermediate capacitor; or at least one transverse capacitor) may be detected simultaneously.

In one or some embodiments, a sequential measurement of the capacitances over time may be termed a serial measurement sequence. In the serial measurement sequence, a single electrode pair may be evaluated, and the capacitance of the electrode pair may be determined. In this case, the capacitances of all capacitors. and/or the capacitances of all intermediate capacitors, and/or the capacitances of all transverse capacitors may be detected sequentially, such as sequentially over time. After a measurement, the next pair of electrodes may be actuated (or sensed) and evaluated. To enable an improved resolution of the transverse distribution of the comminuted harvested material or chopped material, it may be provided that not only opposite electrodes with respect to the height direction are evaluated, but also more distant electrodes. By using a previously determined sensitivity distribution matrix, the transverse distribution calculation may be improved by these additional measurements. After the measurements have been performed, the measurement results may be evaluated by adding the sensitivity distribution matrix, and/or a permittivity distribution with respect to the transverse direction may be determined or calculated. This permittivity distribution may be used as a control variable for improving or optimizing the transverse distribution of the comminuted harvested material or chopped material. In one or some embodiments, the permittivity distribution may be used as a control variable for actuating the actuators of the attachment and/or the actuators of the feeder housing.

In one or some embodiments, the capacitances may be measured at the same time, for example, with a single counter electrode. The single counter electrode may be arranged or positioned at a distance from a plurality of electrodes with respect to the height direction. The single counter electrode may form a capacitor with the plurality of electrodes, wherein the capacitances of these capacitors may be detected or measured simultaneously. An alternating voltage approach may be used in this case. Further, a harmonic signal may be applied to the counter electrode. On a detection side, in one or some embodiments, the capacitances may be evaluated continuously. This has the advantage of minimizing errors due to changes in throughput over time. By detecting the transverse distribution, the throughput signal of the forage harvester may be improved or optimized. This may allow for compensating for unevenness in the flow of the harvested material, for example, in a mat of harvested material. The information about the transverse distribution supplements, for example, a measurement of the throughput and may reduce the calibration effort, since the performed calibration may still be permissible even if there are infeed changes.

In one or some embodiments, an optimization of the transverse distribution of the harvested material is initiated responsive to detecting a non-uniform transverse distribution of the harvested material (e.g., the transverse distribution of the harvested material may be analyzed (such as compared to a predetermined transverse distribution) in order to determine whether the transverse distribution of the harvested material is less uniform than the predetermined transverse distribution). In particular, responsive to detecting the non-uniform transverse distribution of the harvested material, the actuators of the attachment and/or the actuators of the feeder housing may be actuated in order to modify the transverse distribution of the harvested material (e.g., for this purpose of modifying the transverse distribution of the harvested material to be more even). This may allow for an optimization and/or improvement of the transverse distribution of the harvested material in the event of a non-uniform transverse distribution of the harvested material.

Furthermore, in one or some embodiments, a computer program, such as a computer program product, is disclosed that comprises instructions which cause the device to execute any one, any combination, or all of the method steps as disclosed herein.

In addition, in one or some embodiments, a computer-readable medium is disclosed on which exists the computer program that comprises instructions which cause the device to execute any one, any combination, or all of the method steps as disclosed herein.

Referring to the figures, FIG. 1 shows a self-propelled forage harvester 1 according to the prior art. An example forage harvester is disclosed in U.S. Pat. No. 11,122,739, incorporated by reference herein in its entirety. The forage harvester 1 has an attachment 3 for picking up or collecting harvested material 2. In one embodiment, the forage harvester 1 is connected to the attachment 3 via a connector, such as an attachment interface. When the forage harvester 1 is operating, the forage harvester 1 travels in a direction of travel FR through a crop to be harvested, and picks up the harvested material 2 with the attachment 3. When the forage harvester 1 is in harvesting mode, the crop to be harvested is cut by the attachment 3. The cut harvested material 2 may form a stream of harvested material 102 that is conveyed along a conveying direction 101.

The attachment 3 may be exchangeably arranged or positioned on the forage harvester 1. Depending on the harvested material 2 and the purpose of the harvested material, different attachments 3 may therefore be used. For example, a pick up, a corn attachment, a mower (e.g., direct disc), a corn picker or a cutting unit, such as with a reel, may be used as attachments 3.

The attachment 3 picks up the harvested material 2 and conveys it to a harvested material processing channel 4 of the forage harvester 1. The harvested material processing channel 4 processes the harvested material 2 and then conveys it to a discharge chute 100 of the forage harvester 1. The harvested material processing channel 4 is downstream from the attachment 3 relative to the conveying direction 101.

The harvested material processing channel 4 has a feeder housing 5 for supplying the harvested material 2 to the forage harvester 1, a cutterhead 6 for processing the harvested material 2, and a post-acceleration drum 7 for the post-acceleration of the harvested material 2. The harvested material processing channel 4 further comprises an intermediate channel 8 for forwarding the harvested material 2 from the cutterhead 6 to the post-acceleration drum 7. The intermediate channel 8 may be arranged and/or formed between the cutterhead 6 and the post-acceleration drum 7 with respect to the conveying direction 101. Furthermore, the harvested material processing channel 4 has an ejection shaft 9 for ejecting the harvested material 2. The ejection shaft 9 may be arranged and/or formed downstream from the post-acceleration drum 7 with respect to the conveying direction 101. The discharge chute 100 of the forage harvester 1 may be arranged and/or formed downstream from the ejection shaft 9 with respect to the conveying direction 101.

The feeder housing 5 for supplying the harvested material 2 may have adjustable, such as unevenly adjustable and/or differently adjustable, actuators 103, 104, 105 and 106 for feeding the harvested material 2. The harvested material processing channel 4, such as the feeder housing 5 may be designed such that one or more aspects of actuators of the feeder housing 5 (e.g., any one, any combination, or all of the position, the spacing, or the rotational speed of one or more actuators of the feeder housing 5) may be established or controlled. Such actuators may for example be feed drums 103, 104 and/or prepress drums 105, 106.

In one or some embodiments, the feeder housing 5 may have two feed drums 103, 104 which are operated in opposite directions, and two prepress drums 105, 106 which are operated in opposite directions. The two feed drums 103, 104 and the two prepress drums 105, 106 may each be arranged or positioned basically one above the other in the height direction 16. The harvested material 2 may be guided in each case between the two feed drums 103, 104 and between the two prepress drums 105, 106.

Figure 2:
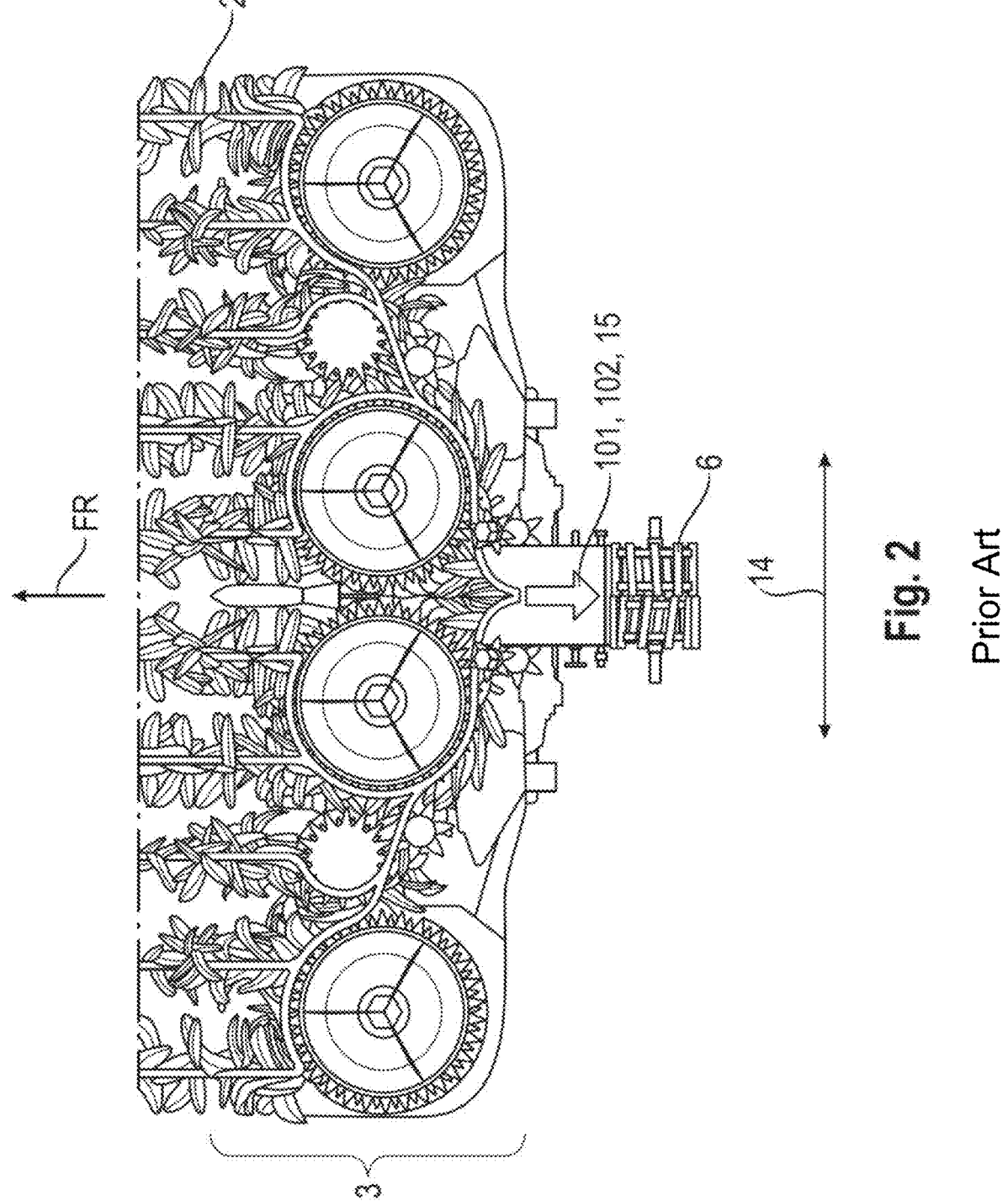
FIG. 2 shows a two-strand infeed according to the prior art.
Figure 3B:
FIG. 3B shows a transverse distribution of harvested material between the feed drums according to one aspect of the invention.
Figure 3B:
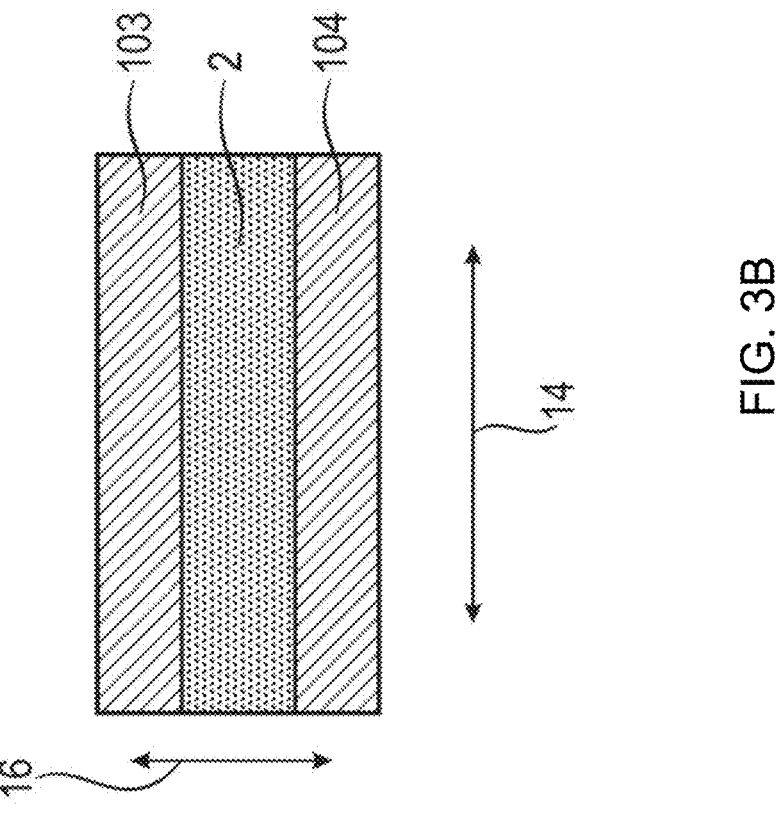
Figure 3A:
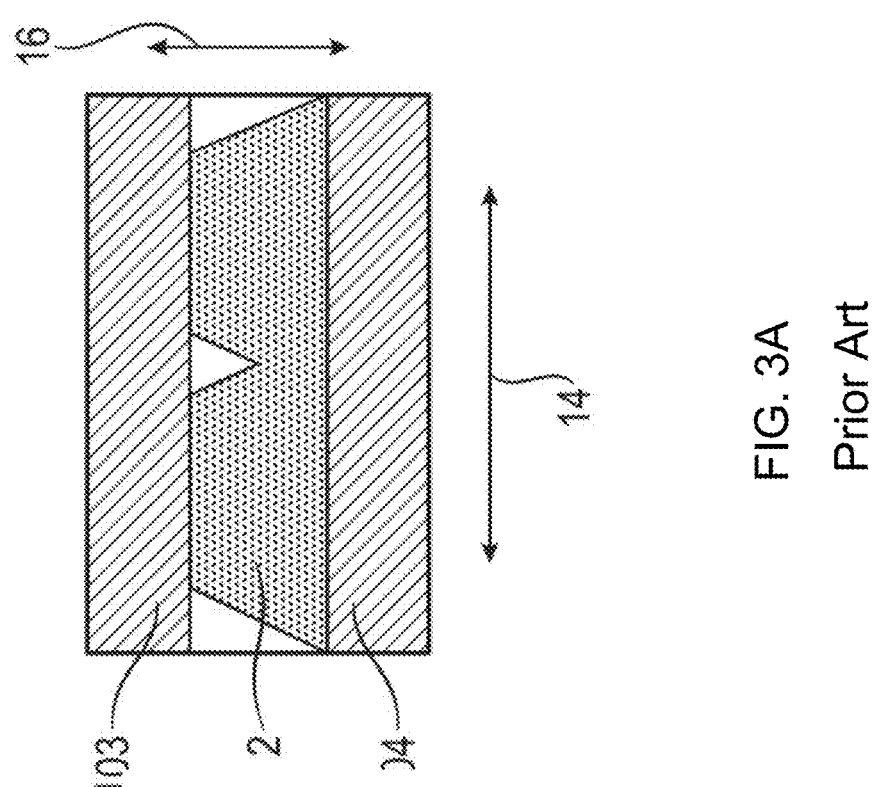
FIG. 3A shows a transverse distribution of harvested material between the feed drums according to the prior art.

A plan view of a two-strand infeed with an attachment 3 is shown, for example, in FIG. 2. Typically, several strands of material, such as two strands of material, are delivered in a self-propelled forage harvester 1 from an attachment 3 into a harvested material processing channel 4. These strands of material may form a flow of harvested material 102 in a self-propelled forage harvester 1 that frequently may not have an even, and/or any, rectangular cross-sectional distribution. Such a non-uniform and/or non-rectangular cross-sectional distribution of the harvested material is shown by way of example in FIG. 3A. In particular, FIG. 3A shows, by way of example, the two feed drums 103 and 104 which are arranged or positioned at a distance from one another with respect to a height direction 16 which is oriented transversely to the flow direction 15 of the harvested material 2 and transversely to the transverse direction 14. The transverse direction 14 may be oriented parallel, such as always parallel, to the cutterhead rotational axis of the cutterhead 6 and/or parallel, such as always parallel, to the post-acceleration drum rotational axis of the post-acceleration drum 7. The flow direction 15 may be oriented parallel to a tangent of the conveying direction 101 and/or parallel to a tangent of the flow of harvested material 102. The cutterhead rotational axis of the cutterhead 6 and/or the post-acceleration drum rotational axis of the post-acceleration drum 7 may be oriented transverse to the direction of travel F.

As may be seen from FIG. 3A, two crop strands often result in a harvested material stream with an M-shaped cross-sectional distribution. Such an uneven cross-sectional distribution of the flow of harvested material yields inferior chopping quality which may yield inferior cutting quality with excess lengths of harvested material. Furthermore an uneven and/or nonrectangular cross-sectional distribution of the flow of harvested material may yield uneven wear of the components of the forage harvester. The uneven wear of the components such as the blades, crack rollers, etc., yield unnecessarily short service lives of the components.

FIGS. 3B to 8 refer to the forage harvester 1 according one or more aspects of the invention, in which the differences from the prior art according to FIGS. 1 to 3A are shown.

Figure 4:
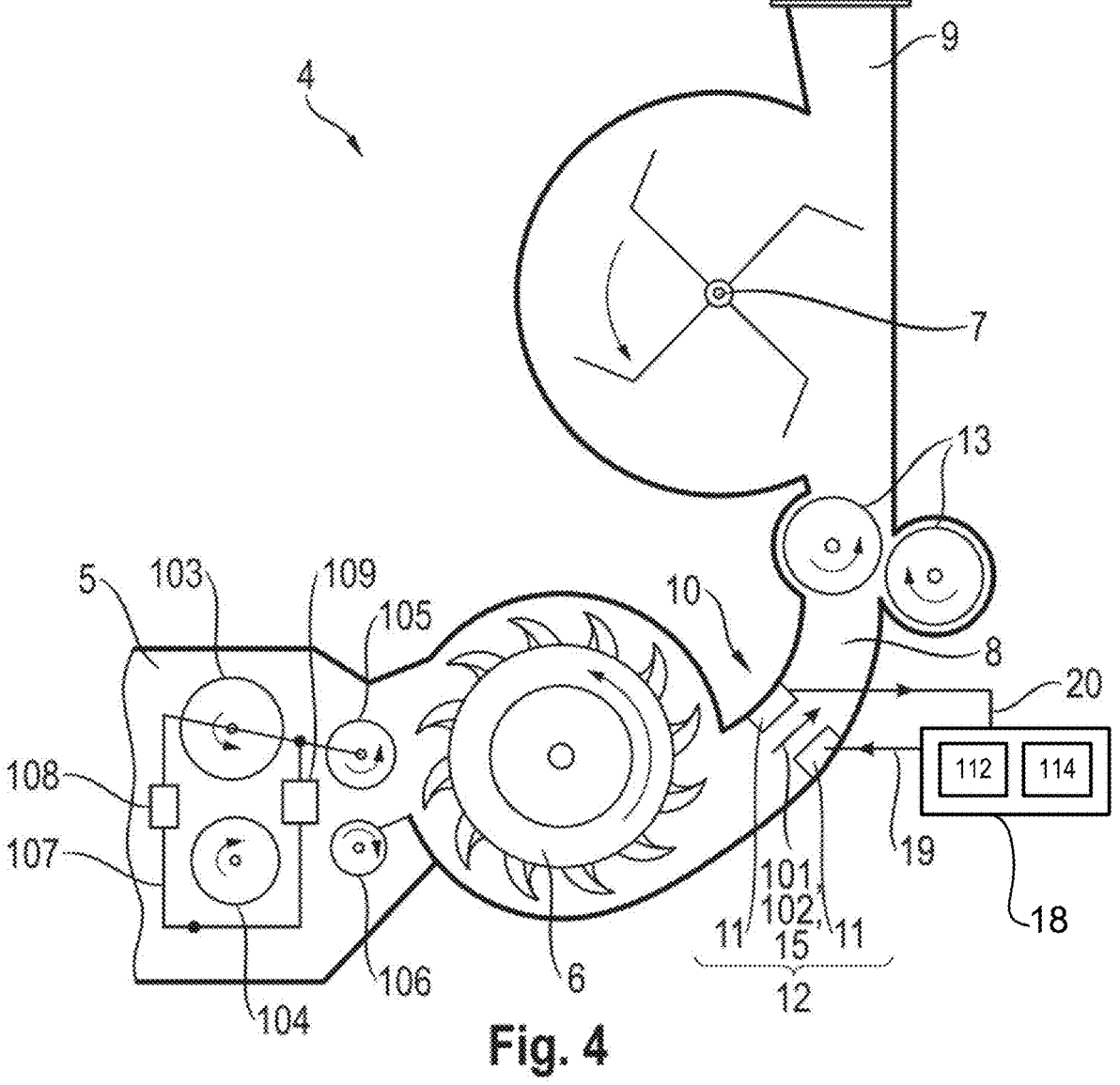
FIG. 4 shows a cross-section of a harvested material processing channel according to one aspect of the invention.

FIG. 4 shows a harvested material processing channel 4, which has a measuring device 10 for recording delivery-specific parameters and/or material-specific parameters. In one or some embodiments, the measuring device 10 has a plurality of electrodes 11 spaced apart from each other that are arranged or positioned in the intermediate channel 8 of the harvested material processing channel 4 and form a plurality of capacitors 12. By measuring the electrical capacitances of the plurality of capacitors 12, the delivery-specific parameters and/or material-specific parameters may be determined.

In contrast to the simplified depiction in FIG. 4, the electrodes 11 may be arranged or positioned within at least one wall 110 or a plurality of walls 110 of the intermediate channel 8, so that the electrodes 11 do not form a flow resistance for the harvested material 2 (e.g., the surface of the intermediate channel 8 is smooth, under or in which the electrodes 11 are placed). This is indicated by way of example in FIG. 5 and FIG. 6.

As shown in FIG. 4, the harvested material processing channel 4 may have a conditioning apparatus 13 for conditioning the harvested material 2. The conditioning apparatus 13 is arranged or positioned or positioned between the cutterhead 6 and the post-acceleration drum 7 with respect to the conveying direction 101. In such a setup, the electrodes 11 may be arranged or positioned in the intermediate channel 8 between the cutterhead 6 and the conditioning apparatus 13.

Figure 5:
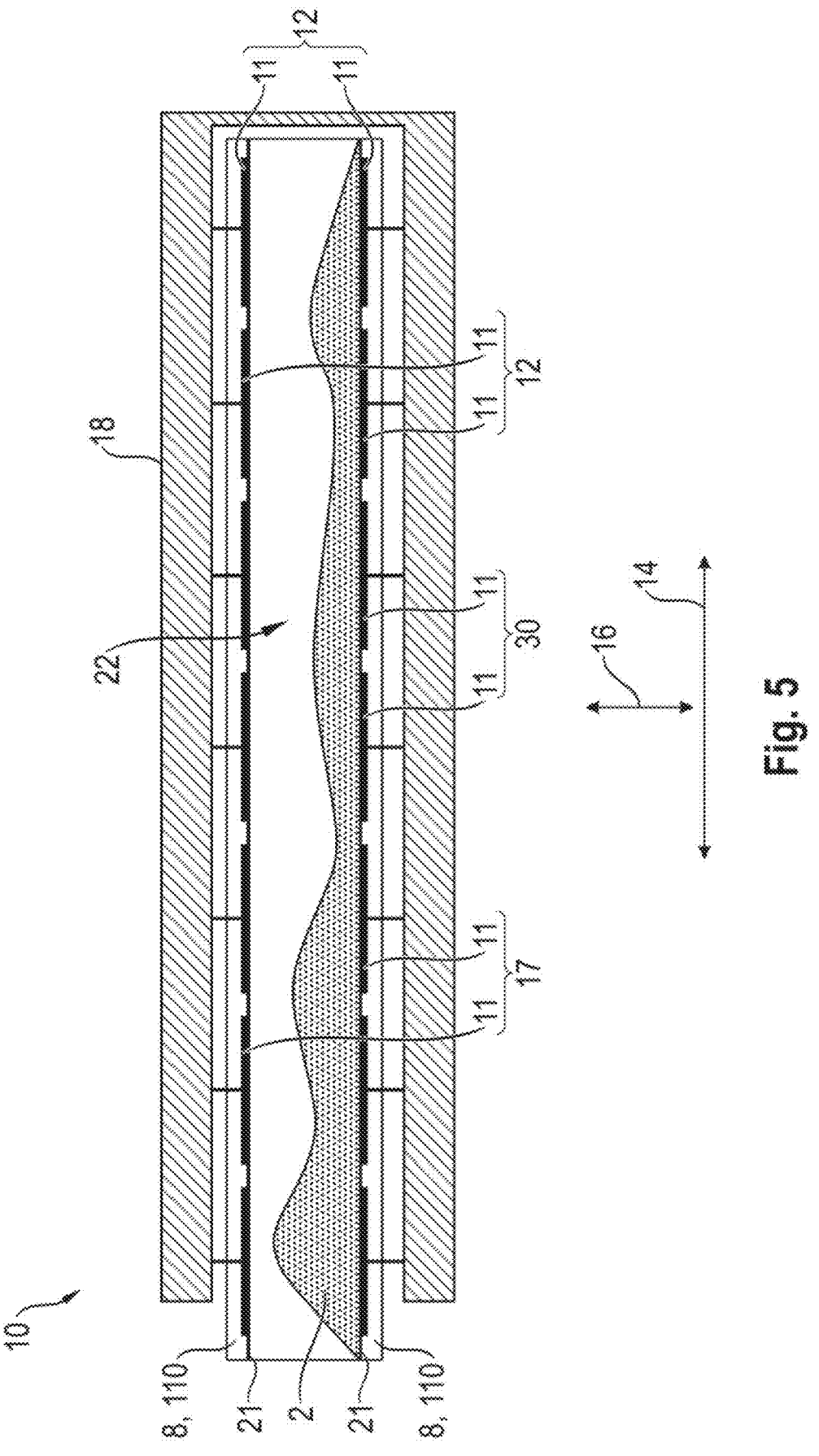
FIG. 5 shows a cross-section of a measuring device according to one aspect of the invention.

As shown in FIG. 5, the capacitors 12 are arranged or positioned in the intermediate channel 8 along a transverse direction 14 transverse to the flow direction 15 of the harvested material 2. In this case, the capacitors 12 may be arranged or positioned at a distance from each other with respect to the transverse direction 14. In this case, the electrodes 11 of the capacitors 12 are arranged or positioned at a distance from one another with respect to a height direction 16, which is oriented transversely to the flow direction 15 of the harvested material 2 and transversely to the transverse direction 14, so that the harvested material 2 may flow through the capacitors 12.

FIG. 5 indicates that an electrode 11 of a capacitor 12 may form an intermediate capacitor 17 with an electrode 11 of at least one additional capacitor 12. In this case, the distance between the electrodes 11 of the intermediate capacitor 17 is greater than the distance between the electrodes 11 of the capacitors 12. FIG. 5 indicates that at least two electrodes 11 spaced apart from each other with respect to the transverse direction 14, whose position coincides with respect to the height direction 16, may form a transverse capacitor 30.

Figure 6:
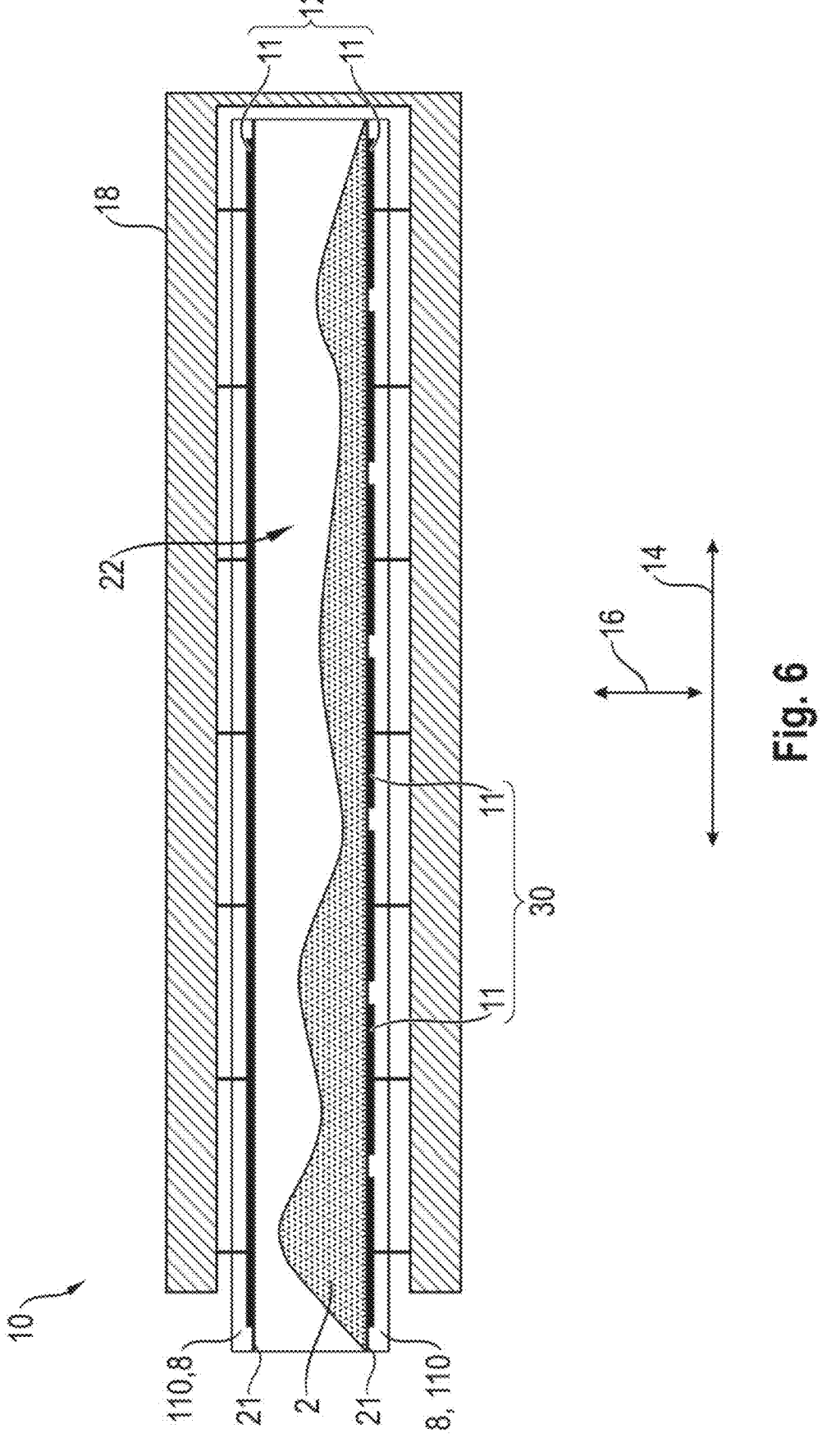
FIG. 6 shows a cross-section of a further measurement device according to one aspect of the invention.

FIG. 6 shows, by way of example, that a single electrode 11 may be arranged or positioned at a distance from a plurality of electrodes 11 with respect to the height direction 16, wherein this single electrode 11 forms a plurality of capacitors 12 with all electrodes 11 that are spaced apart with respect to the height direction 16. The single electrode 11 has a greater extension (e.g., distance) with respect to the transverse direction 14 than the electrodes 11 spaced apart from each other with respect to the height direction 16. Moreover, the single electrode 11 has a greater extension (e.g., distance) along the transverse direction 14 than the sum of the transverse direction extensions of all electrodes 11 spaced apart from the single or longer electrode 11 with respect to the height direction 16. Also in FIG. 6, at least two electrodes 11 spaced apart from each other with respect to the transverse direction 14, whose position coincides with respect to the height direction 16, may form a transverse capacitor 30.

Figure 7:
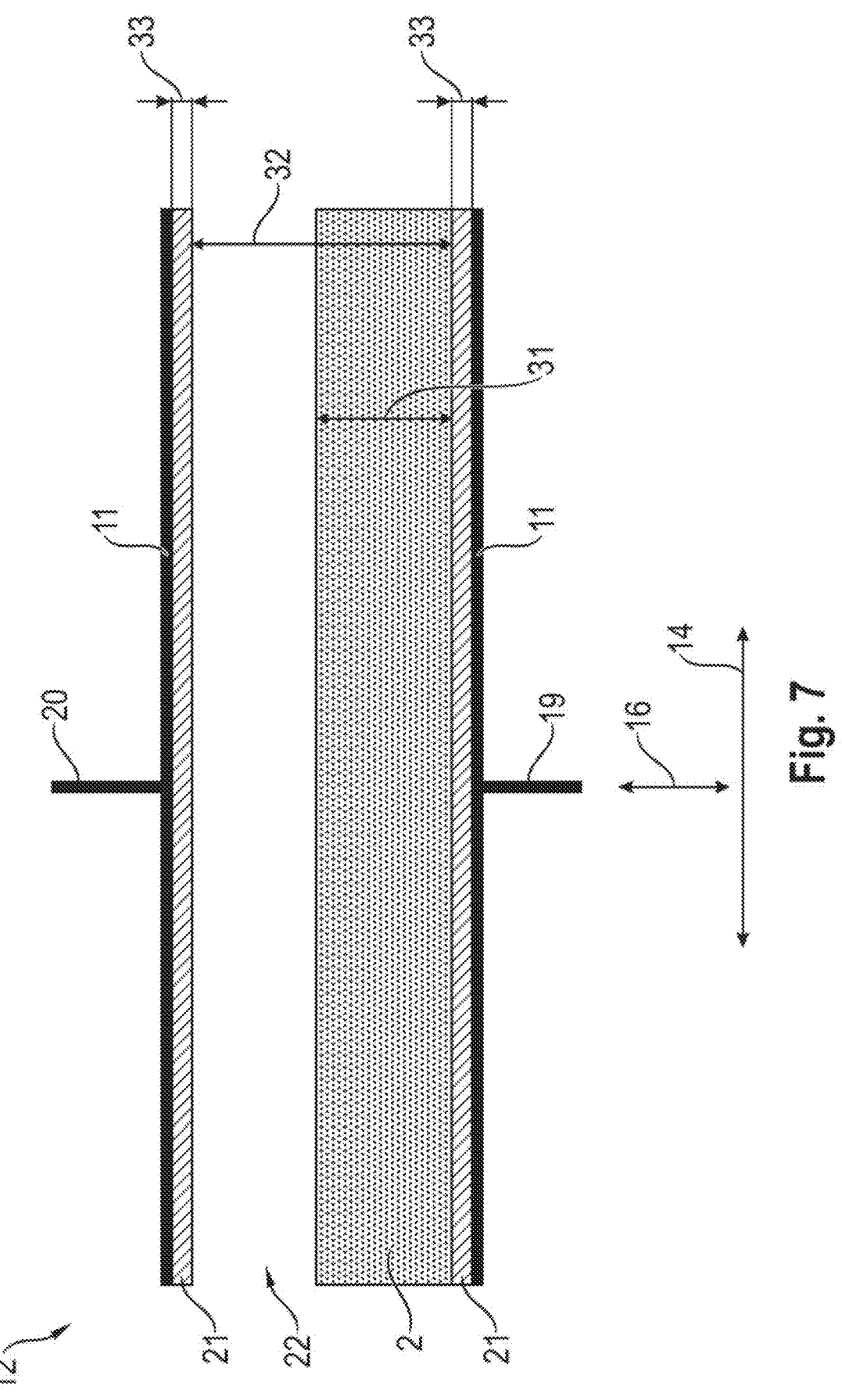
FIG. 7 shows a cross-section of a capacitor according to one aspect of invention.

FIG. 7 shows an example of the structure of a capacitor 12 of FIG. 5, through which a harvested material 2 flows. The capacitor 12 comprises two electrodes 11 which are arranged or positioned at a distance from one another with respect to the height direction 16 in such a way that the harvested material 2 may flow between these two electrodes 11. In one or some embodiments, the electrodes 11 each have a protective apparatus 21, such as an electrically weakly conductive layer and/or a non-conductive layer. These protective apparatuses 21 may be formed from a nonmetallic material. The protective apparatus 21 may cover the electrodes 11 in such a way that conduction of electrical current between the first electrode 11 and the second electrode 11 is suppressed or does not form. Therefore, the presence of a capacitor 12 having a capacitance may always be ensured. However, an electric field may be formed between the two electrodes 11 of the capacitor 12.

In this portrayed example of FIG. 7, the harvested material 2 has a height thickness 31 that is, for example, smaller than the distance between the protective apparatuses 21 with respect to the height direction 16. Air 22 is present between the harvested material 2 and the upper protective apparatus 21 in FIG. 7 and is symbolized by the white region. The air 22 has a different permittivity compared to the harvested material 2, so that the capacitance of the capacitor 12 depends on the amount of harvested material 2 flowing through.

The harvested material 2 changes the permittivity of the space between the protective apparatuses 21 that the electric field passes through. The change in capacitance of the capacitor depends on the permittivity. The change depends on both the material of the harvested material 2 and the material/air ratio. Since the harvested material 2 may be assumed to be constant across its width, the capacitance signal of the capacitor 12 may depend on the amount of harvested material 2 in the capacitor 12. When calculating the capacitance of the capacitor, the permittivity of the protective apparatuses 21 may also be included in calculating the capacitance signal of the capacitor 12. When calculating the capacitance signal of the capacitor 12, a height thickness 31 of the harvested material 2 with respect to the height direction 16 may also be included. When calculating the capacitance signal of the capacitor 12, a height distance 32 of the protective apparatuses 21 with respect to the height direction 16 may be included. When calculating the capacitance signal of the capacitor 12, the height thickness 36 of the protective apparatuses 21 with respect to the height direction 16 may be included.

According to FIG. 4, the measuring device 10 has a control and regulating apparatus 18 that is designed to detect or determine any one, any combination, or all of: the capacitance of the capacitors 12; the capacitance of at least one intermediate capacitor 17; or the capacitance of at least one transverse capacitor 30. Furthermore, the control and regulating apparatus 18 may be configured to determine the transverse distribution of the harvested material 2 using the detected capacitances, and to control actuators of the attachment 3 and/or actuators of the feeder housing 5 responsive to the determined transverse distribution of the harvested material 2.

In one or some embodiments, the control and regulating apparatus 18 may include any type of computing functionality, such as at least one processor 112 (which may comprise a microprocessor, controller, PLA, or the like) and at least one memory 114. The memory 114 may comprise any type of storage device (e.g., any type of memory). Though the processor 112 and the memory 114 are depicted as separate elements, they may be part of a single machine, which includes a microprocessor (or other type of controller) and a memory. Alternatively, the processor 112 may rely on memory 114 for all of its memory needs.

The processor 112 and memory 114 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. Further, the functionality discussed herein, such as the determination of the capacitance, the determination of the distribution (e.g., the transverse distribution), the determination of the control, or the actuation of the control (e.g., sending commands to control the actuator(s)), may be performed by the computing functionality.

In this regard, the attachment 3 may be designed such that the position, and/or the spacing, and/or the rotational speed of one or more actuators (not shown) of the attachment 3 may be established, take place or be controlled. In particular, the harvested material processing channel 4, such as the feeder housing 5, may be designed such that the position, and/or the spacing, and/or the rotational speed of one or more actuators 103, 104, 105 and/or 106 of the feeder housing, may be established or be controlled. For example, a prepress apparatus 107 with several hydraulic cylinders 108 and/or electric cylinders 108 may be provided, which may adjust the spacing between the feed drums 103, 104 and/or the spacing between the prepress drums 105, 106. For example, the control and regulating apparatus 18 may adjust these spacings in such a way that, for example, a desired or an optimal transverse distribution of the harvested material 2 is achieved. Such a desired or an optimal transverse distribution of the harvested material 2 is shown, for example, in FIG. 3B, where the spacing between the feed drums 103, 104 has been reduced for optimization as compared to FIG. 3A (e.g., the spacing of the feed drums 103, 104 is controlled in order to obtain the desired transverse distribution of the harvested material 2 shown in FIG. 3B).

Figure 8:
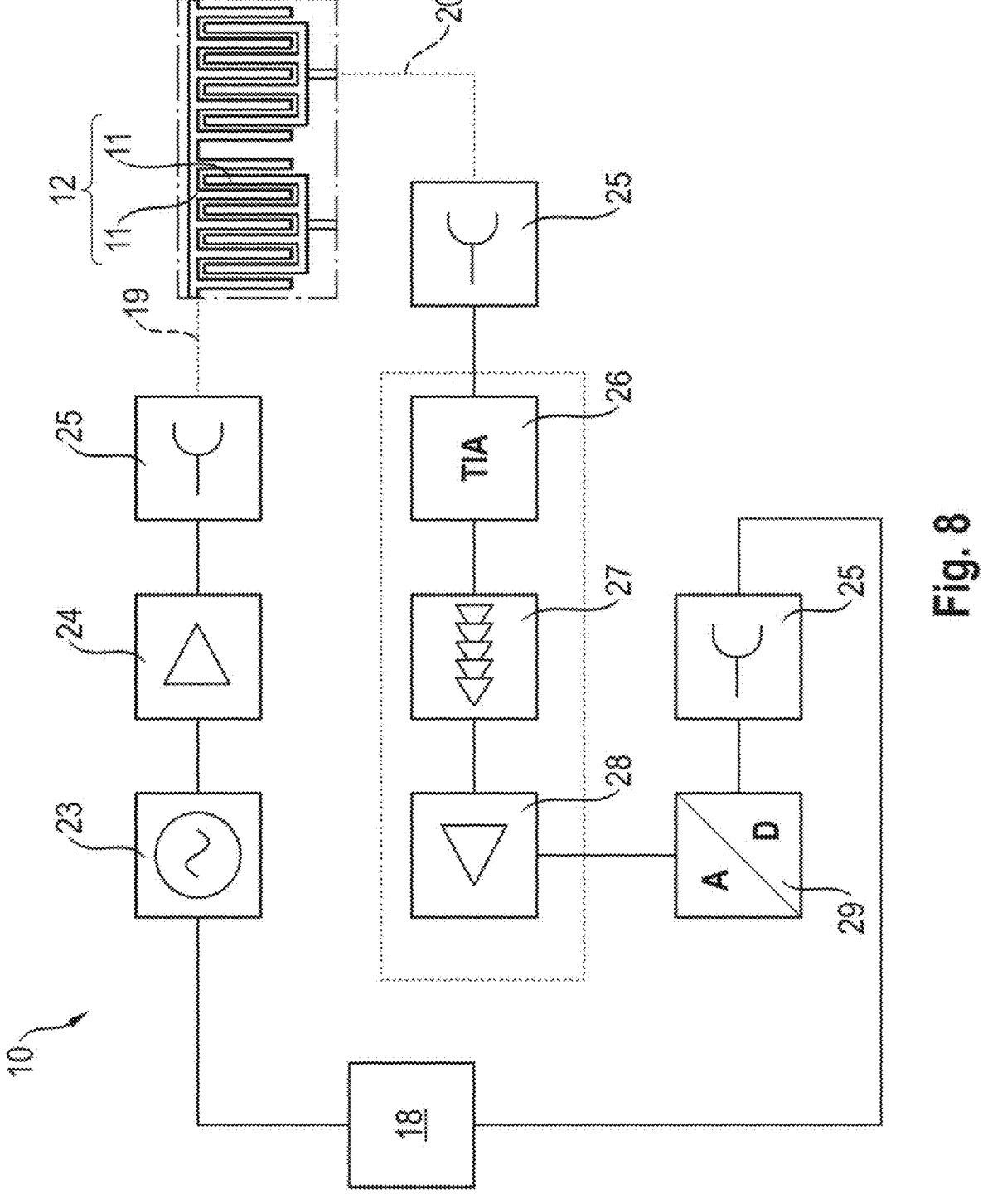
FIG. 8 shows a measuring circuit according to the invention for determining the transverse distribution of harvested material.

According to FIG. 8, the measuring device 10 has at least one AC voltage generator 23 for generating an AC voltage, an amplifier unit 24 for amplifying a signal, an electrical amplifier 26 for converting an input current into a proportional output voltage, a detector 27, such as at least one logarithmic detector, for converting an AC voltage into a line signal, another amplifier unit 28 for amplifying a signal, and at least one analog-to-digital converter 29 for converting an analog signal into a digital, in particular digitally interpretable, signal.

The AC voltage generator 23 may be electrically conductively connected to the amplifier unit 24, wherein the amplifier unit 24 is electrically conductively connected to a first electrode 11 of a capacitor 12 via a connection component 25 which forms an output component. In this case, an input signal 19 for the capacitor 12 is transmitted in the form of AC voltage to the first electrode 11 of a capacitor 12. A second electrode 11 of the capacitor 12 is arranged or positioned at a distance from the first electrode 11. An electric current conduction between the first electrode 11 and the second electrode 11 is suppressed or does not form. The second electrode 11 of the capacitor 12 may be electrically conductively connected to a further connection component 25 that forms an input component. In this case, an output signal 20 of the capacitor 12 is transmitted to the connection component 25. The further connection component 25 may be electrically conductively connected to the transimpedance amplifier 26. The transimpedance amplifier 26 may be electrically conductively connected to the detector 27, in particular to the logarithmic detector. The detector 27, such as the logarithmic detector, may be electrically conductively connected to the amplifier unit 28. The amplifier unit 28 may be electrically conductively connected to the analog-to-digital converter 29. The analog-to-digital converter 29 may be connected to another connection component 25 that forms an output component. The control and regulation apparatus 18 may be designed to control the AC voltage generator 23 and to read out or detect the capacitances of the capacitors 12.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Forage harvester
2 Harvested material, crop to be harvested
3 Attachment
4 Harvested material processing channel
5 Feeder housing
6 Cutterhead
7 Post-acceleration drum
8 Intermediate channel
9 Ejection shaft
10 Measuring device
11 Electrode
12 Capacitor
13 Conditioning apparatus
14 Transverse direction
15 Direction of flow
16 Height direction
17 Intermediate capacitor
18 Control and regulation apparatus
19 Input signal
20 Output signal
21 Protective apparatus
22 Air
23 AC voltage generator
24 Amplifier unit
25 Connection component
26 Electrical amplifier
27 Detector, in particular logarithmic detector
28 Amplifier unit
29 Analog-to-digital converter
30 Transverse capacitor
31 Height thickness of the harvested material
32 Height distance of the protective apparatuses
33 Height thickness of the protective apparatuses
100 Discharge chute
101 Delivery direction
102 Harvested material flow
103, 104 Feed drums
105, 106 Prepress drums
107 Prepress apparatus
108, 109 Hydraulic cylinder and/or electric cylinder
110 Wall
112 Processor
114 Memory
FR Direction of travel

The invention claimed is:

1. A self-propelled forage harvester configured to work with an attachment that collects harvested material and to process the harvested material, the forage harvester comprising:

a harvested material processing channel that is downstream from the attachment, the harvested material processing channel including:

a feeder housing configured to supply the harvested material to the forage harvester;

a cutterhead configured to process the harvested material;

a post-acceleration drum configured for post-acceleration of the harvested material;

an intermediate channel configured to forward the harvested material from the cutterhead to the post-acceleration drum; and an ejection shaft configured to eject the harvested material; and a measuring device comprising a plurality of electrodes spaced apart from one another, wherein the plurality of electrodes form a plurality of capacitors and comprise at least a first electrode and a second electrode, wherein the first electrode and second electrode are, respectively, connected to opposing walls of the intermediate channel of the harvested material processing channel to form at least one capacitor of the plurality of capacitors, the measuring device configured to measure electrical capacitances of the plurality of capacitors;

wherein the forage harvester is configured to determine one or both of delivery-specific parameters or material-specific parameters from measurements of the electrical capacitances of the plurality of capacitors.

2. The forage harvester of claim 1, wherein the forage harvester is further configured to:

determine, based on the measurements of the electrical capacitances of at least some of the plurality of capacitors, a transverse distribution of the harvested material; and control, based on the transverse distribution of the harvested material, flow of the harvested material.

3. The forage harvester of claim 2, wherein the forage harvester is configured to control the flow of the harvested material by:

determining whether the transverse distribution of the harvested material is non-uniform; and responsive to determining that the transverse distribution of the harvested material is non-uniform, controlling one or more actuators on one or both of the forage harvester or the attachment in order to modify the flow of the harvested material.

4. The forage harvester of claim 3, wherein the forage harvester is configured to determine the transverse distribution of the harvested material based on the electrical capacitances of all of the plurality of capacitors.

5. The forage harvester of claim 1, wherein the first electrode and the second electrode are positioned within the opposing walls of the intermediate channel of the harvested material processing channel.

6. A self-propelled forage harvester configured to work with an attachment that collects harvested material and to process the harvested material, the forage harvester comprising:

a harvested material processing channel that is downstream from the attachment, the harvested material processing channel including:

a feeder housing configured to supply the harvested material to the forage harvester;

a cutterhead configured to process the harvested material;

a post-acceleration drum configured for post-acceleration of the harvested material;

an intermediate channel configured to forward the harvested material from the cutterhead to the post-acceleration drum; and an ejection shaft configured to eject the harvested material; and a measuring device comprising a plurality of electrodes spaced apart from one another and positioned in the intermediate channel of the harvested material processing channel to form a plurality of capacitors, the measuring device configured to measure electrical capacitances of the plurality of capacitors;

wherein the forage harvester is configured to determine one or both of delivery-specific parameters or material-specific parameters from measurements of the electrical capacitances of the plurality of capacitors;

wherein the harvested material processing channel further includes a conditioning apparatus configured to condition the harvested material;

wherein the conditioning apparatus is positioned between the cutterhead and the post-acceleration drum; and wherein the plurality of electrodes are positioned in the intermediate channel between the cutterhead and the conditioning apparatus.

7. The forage harvester of claim 1, wherein one or both of:

the capacitors are positioned in the intermediate channel along a transverse direction transverse to direction of flow of the harvested material; or the electrodes of the capacitors are sufficiently spaced from each other relative to a height direction that is oriented transverse to the direction of the flow of the harvested material and transverse to the transverse direction so that the flow of the harvested material through the capacitors.

8. The forage harvester of claim 1, wherein at least one electrode of at least one capacitor and at least one electrode of at least one additional capacitor form an intermediate capacitor; and wherein distance between the at least one electrode of the at least one capacitor and the at least one electrode of at least one additional capacitor that form the intermediate capacitor is greater than the distance between electrodes of the at least one capacitor and electrodes of the at least one additional capacitor.

9. The forage harvester of claim 1, wherein a single electrode is positioned at a distance from the plurality of electrodes with respect to a height direction; and wherein the single electrode forms a plurality of capacitors with all of the plurality of electrodes that are spaced apart with respect to the height direction.

10. The forage harvester of claim 9, wherein one or both of:

the single electrode has a greater distance with respect to a transverse direction than the plurality of electrodes spaced apart from each other with respect to a height direction; or the single electrode has a greater distance along the transverse direction than a sum of distances in the transverse direction of all of the plurality of electrodes spaced apart with respect to the height direction.

11. The forage harvester of claim 10, wherein at least two electrodes spaced from each other with respect to a transverse direction, whose position coincides with respect to a height direction, form a transverse capacitor.

12. The forage harvester of claim 1, wherein at least one electrode of at least one capacitor and at least one electrode of at least one additional capacitor form at least one intermediate capacitor;

wherein at least two electrodes spaced from each other with respect to a transverse direction, whose position coincides with respect to a height direction, form at least one transverse capacitor;

wherein the measuring device includes a control and regulating apparatus that is configured to detect one or more of the electrical capacitance of the plurality of capacitors, the electrical capacitance of the at least one intermediate capacitor, or the electrical capacitance of the at least one transverse capacitor;

wherein the control and regulating apparatus is configured to determine a transverse distribution of the harvested material based on the one or more of the electrical capacitance of the plurality of capacitors, the electrical capacitance of at least one intermediate capacitor, or the electrical capacitance of at least one transverse capacitor; and wherein the control and regulation apparatus is configured to control one or more actuators of one or both of the attachment or of the feeder housing the transverse distribution of the harvested material.

13. The forage harvester of claim 1, wherein the measuring device includes one or more of:

at least one AC voltage generator for generating an AC voltage; or at least one amplifier unit for amplifying a signal;

at least one electrical amplifier for converting an input current into a proportional output voltage;

at least one detector for converting the AC voltage into a line signal; or at least one analog-to-digital converter for converting an analog signal into a digital signal.

14. A method for controlling a self-propelled forage harvester, the forage harvester working with an attachment that collects harvested material and processing the harvested material, the method comprising:

detecting capacitances of one or more of: a plurality of capacitors; at least one intermediate capacitor; or at least one transverse capacitor;

determining a transverse distribution of the harvested material based on the capacitances detected; and actuating, based on the transverse distribution of the harvested material, one or more actuators of one or both of the attachment or of a feeder housing of the forage harvester;

wherein detecting the capacitance is by using a measuring device comprising a plurality of electrodes spaced apart from one another, wherein the plurality of electrodes form a plurality of capacitors and comprise at least a first electrode and a second electrode, wherein the first electrode and second electrode are, respectively, connected to opposing walls of an intermediate channel of the harvested material processing channel to form at least one capacitor of the plurality of capacitors, the measuring device configured to measure the capacitances of the plurality of capacitors.

15. The method of claim 14, wherein the capacitances of one or more of the plurality of capacitors, the at least one intermediate capacitor, or the at least one transverse capacitor are detected sequentially over time.

16. The method of claim 14, wherein the capacitances of one or more of the plurality of capacitors, the at least one intermediate capacitor, or the at least one transverse capacitor are detected simultaneously.

17. The method of claim 14, further comprising determining whether the transverse distribution is non-uniform; and wherein, responsive to determining the transverse distribution is non-uniform, modifying flow of the harvested material by actuating the one or more actuators.

18. The method of claim 17, wherein responsive to determining the transverse distribution is non-uniform, initiating an optimization of the transverse distribution of the harvested material.

19. The method of claim 18, wherein a harvested material processing channel is downstream from the attachment and includes a feeder housing that supplies the harvested material to the forage harvester, a cutterhead configured that processes the harvested material, a post- acceleration drum that post-accelerates the harvested material, a conditioning apparatus that conditions the harvested material and is positioned between the cutterhead and the post-acceleration drum, an intermediate channel that forwards the harvested material from the cutterhead to the post-acceleration drum and an ejection shaft configured to eject the harvested material;

wherein a plurality of electrodes that form the plurality of capacitors are positioned within at least one wall of the intermediate channel of the harvested material processing channel; and wherein the plurality of electrodes are positioned in the intermediate channel between the cutterhead and the conditioning apparatus.

20. The forage harvester of claim 1, wherein the first electrode and the second electrode each have a respective protective apparatus;

wherein the respective protective apparatuses are a non-conductive layer or a conductive layer more weakly that the first electrode and the second electrode;

wherein the respective protective apparatuses are flush with an inner surface within or on the intermediate channel;

wherein a height thickness of the harvested material is less than a distance between the respective protective apparatuses of the first electrode and the second electrode;

wherein permittivity of space between the respective protective apparatuses is changed based on the harvested material; and wherein the electrical capacitance of a respective capacitor of the plurality of capacitors depends on the permittivity.

\* \* \* \* \*